(12) United States Patent
Kelford et al.

(10) Patent No.: US 11,572,850 B2
(45) Date of Patent: Feb. 7, 2023

(54) ACOUSTIC PANEL WITH ONE OR MORE STRUCTURAL STIFFENERS

(71) Applicant: Rohr, Inc., Chula Vista, CA (US)

(72) Inventors: Bryce T. Kelford, San Diego, CA (US); Jose S. Alonso-Miralles, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 678 days.

(21) Appl. No.: 16/431,178

(22) Filed: Jun. 4, 2019

(65) Prior Publication Data

US 2020/0386187 A1 Dec. 10, 2020

(51) Int. Cl.
*F02K 1/82* (2006.01)
*G10K 11/172* (2006.01)

(52) U.S. Cl.
CPC ............ *F02K 1/827* (2013.01); *G10K 11/172* (2013.01); *F05D 2260/96* (2013.01)

(58) Field of Classification Search
CPC .... G10K 11/172; F02K 1/827; F05D 2260/96
USPC ........................................................ 181/286
See application file for complete search history.

(56) References Cited

U.S. PATENT DOCUMENTS

| | | | |
|---|---|---|---|
| 2,333,343 A | 11/1943 | Tadeusz | |
| 2,848,132 A | 8/1958 | Leon | |
| 3,341,395 A * | 9/1967 | Weber | E04C 2/3405 428/134 |
| 3,507,355 A | 4/1970 | Lawson | |
| 3,542,152 A | 11/1970 | Adamson | |
| 3,639,106 A | 2/1972 | Yate | |
| 3,734,234 A | 5/1973 | Wirt | |
| 3,821,999 A | 7/1974 | Guess et al. | |
| 3,848,697 A | 11/1974 | Jannot et al. | |
| 3,850,261 A | 11/1974 | Hehmann et al. | |
| 3,910,374 A | 10/1975 | Holehouse | |
| 3,948,346 A | 4/1976 | Schindler | |
| 4,189,027 A | 2/1980 | Dean, III et al. | |
| 4,240,519 A | 12/1980 | Wynosky | |
| 4,541,879 A | 9/1985 | Riel | |
| 4,743,740 A | 5/1988 | Adee | |
| 4,859,517 A | 8/1989 | Hull | |
| 5,431,980 A | 7/1995 | McCarthy | |
| 5,923,003 A | 7/1999 | Arcas et al. | |
| 5,927,647 A | 7/1999 | Masters et al. | |

(Continued)

FOREIGN PATENT DOCUMENTS

| | | |
|---|---|---|
| CN | 104723616 A | 6/2015 |
| FR | 2201010 A5 | 4/1974 |

(Continued)

OTHER PUBLICATIONS

EP search report for EP19212692.8 dated Jun. 16, 2020.
EP Office Action for EP19212692.8 dated Apr. 8, 2022.

*Primary Examiner* — Forrest M Phillips
(74) *Attorney, Agent, or Firm* — Getz Balich LLC

(57) ABSTRACT

An acoustic panel is provided that includes a perforated first skin, a second skin and a core. The core includes a first wall, a second wall and a stiffener. The core forms a plurality of cavities that extend vertically between the perforated first skin and the second skin and that extend laterally between the first wall and the second wall. The plurality of cavities include a first cavity. The stiffener projects partially into the first cavity and is connect to the first wall and the second wall.

20 Claims, 11 Drawing Sheets

(56) References Cited

U.S. PATENT DOCUMENTS

| | | | |
|---|---|---|---|
| 5,997,985 A | 12/1999 | Clarke et al. | |
| 6,871,725 B2 | 3/2005 | Johnson | |
| 7,124,856 B2 | 10/2006 | Kempton et al. | |
| 7,588,212 B2 | 9/2009 | Moe et al. | |
| 7,784,283 B2 | 8/2010 | Yu et al. | |
| 7,814,658 B2 | 10/2010 | Akishev et al. | |
| 7,954,224 B2 | 6/2011 | Douglas | |
| 7,959,109 B2 | 6/2011 | Dasilva et al. | |
| 7,963,362 B2 | 6/2011 | Lidoine | |
| 7,971,684 B2 | 7/2011 | Gantie et al. | |
| 8,025,122 B2 | 9/2011 | Gilcreest et al. | |
| 8,245,815 B2 | 8/2012 | Valleroy et al. | |
| 8,336,316 B2 | 12/2012 | Kirby | |
| 8,413,922 B2 | 4/2013 | Porte et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,763,751 B2 | 7/2014 | Starobinski et al. | |
| 8,776,946 B2 | 7/2014 | Todorovic | |
| 8,820,477 B1 | 9/2014 | Herrera et al. | |
| 8,955,643 B2 | 2/2015 | Liu | |
| 9,764,818 B2 * | 9/2017 | Nampy | B64C 1/066 |
| 10,032,445 B1 | 7/2018 | Linch et al. | |
| 2007/0034447 A1 * | 2/2007 | Proscia | F02C 7/24 181/290 |
| 2011/0100747 A1 | 5/2011 | Hoetzeldt et al. | |
| 2011/0244150 A1 * | 10/2011 | Thrash | F02K 3/06 29/446 |
| 2013/0266772 A1 | 10/2013 | Fujii | |
| 2014/0349082 A1 | 11/2014 | Tien | |
| 2015/0284945 A1 * | 10/2015 | Tien | B32B 37/0084 181/294 |
| 2015/0292413 A1 | 10/2015 | Soria et al. | |
| 2015/0367953 A1 | 12/2015 | Yu | |
| 2017/0225764 A1 * | 8/2017 | Nampy | B64C 1/40 |
| 2017/0301334 A1 * | 10/2017 | Nampy | G10K 11/172 |
| 2018/0142621 A1 * | 5/2018 | Biset | F02K 1/827 |
| 2019/0063318 A1 | 2/2019 | Roach et al. | |

FOREIGN PATENT DOCUMENTS

| | | |
|---|---|---|
| GB | 1406844 A | 9/1975 |
| RU | 2413654 C2 | 6/2011 |

* cited by examiner

ACOUSTIC PANEL WITH ONE OR MORE STRUCTURAL STIFFENERS

BACKGROUND

1. Technical Field

This disclosure relates generally to noise attenuation and, more particularly, to an acoustic panel for attenuating noise generated by, for example, a gas turbine engine of an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for relatively low frequency noise. There is a need in the art therefore for an acoustic panel operable to attenuate relatively low frequency noise while utilizing the same or less space than legacy acoustic panel designs. There is a further need to provide such a panel with the same or more structural integrity than previous acoustic panels.

SUMMARY OF THE DISCLOSURE

According to an aspect of the present disclosure, an acoustic panel is provided that includes a perforated first skin, a second skin and a core. The core includes a first wall, a second wall and a stiffener. The core forms a plurality of cavities that extend vertically between the perforated first skin and the second skin and that extend laterally between the first wall and the second wall. The plurality of cavities include a first cavity. The stiffener projects partially into the first cavity and is connected to the first wall and the second wall.

According to another aspect of the present disclosure, another acoustic panel is provided that includes a first skin, a second skin and a core. The core includes a first wall, a second wall and a stiffener. The core forms a plurality of cavities that extend vertically between the first skin and the second skin and that extend laterally between the first wall and the second wall. The plurality of cavities include a first cavity. The stiffener projects partially into the first cavity. An aperture extends longitudinally through the stiffener. One or more perforations in the first skin are fluidly coupled with the first cavity.

According to still another aspect of the present disclosure, another acoustic panel is provided that includes a perforated first skin, a second skin and a core. The core includes a corrugated ribbon, a first wall, a second wall and a stiffener. The corrugated ribbon is configured with a plurality of baffles and a plurality of septums. The corrugated ribbon forms a plurality of cavities within the core. The plurality of cavities extend vertically between the first skin and the second skin. The plurality of cavities extend laterally between the first wall and the second wall. The plurality of cavities includes a first cavity. The stiffener vertically tapers as the stiffener extends laterally from the first wall to the second wall.

One or more perforations in the perforated first skin may be fluidly coupled with the first cavity.

The first cavity may form a resonance chamber having a minimum length that extends between the perforated first skin and the second skin; e.g., along a baffle of the core. The minimum length may be longer than a vertical thickness of the core.

The core may also include a plurality of baffles and a plurality of septums. The plurality of baffles may include a first baffle and a second baffle. The plurality of septums may include a first septum. The plurality of baffles may be arranged in a longitudinal linear array. Each of the plurality of baffles may be connected to and extends laterally between the first wall and the second wall. The first cavity may extend longitudinally between the first baffle and the second baffle. The plurality of septums may be arranged in a longitudinal linear array. Each of the plurality of septums may be connected to and extends laterally between the first wall and the second wall. The first septum may be disposed between the first baffle and the second baffle. The first septum may divide the first cavity into fluidly coupled first and second sub-cavities.

The stiffener may project partially into the first sub-cavity. In addition or alternatively, the stiffener may be between the first baffle and the first septum.

The stiffener may be connected to and extend laterally along the perforated first skin between the first wall and the second wall.

The stiffener may be arranged perpendicular to the first wall and the perforated first skin.

The stiffener may be configured with a triangular base that extends laterally across the first cavity.

The stiffener may include a base and a mount cantilevered from the base. The base may extend laterally across the first cavity. The mount may be bonded to the first wall and/or the second skin.

The stiffener may also include a second mount cantilevered from the base. The mount may be bonded to the second wall and/or the perforated first skin.

An aperture may extend longitudinally through the stiffener.

The plurality of cavities may also include a second cavity longitudinally adjacent the first cavity. The core may also include a second stiffener projecting partially into the second cavity and connected to the first wall and the second wall.

The plurality of cavities may also include a second cavity longitudinally adjacent the first cavity. The core may be configured without a stiffener within the second cavity.

The core may be configured from or otherwise include fiber-reinforced composite material.

The perforated first skin, the second skin and the core may form a component of an aircraft propulsion system.

The stiffener may be connected to the first wall and/or the second wall.

The stiffener may be connected to and extend laterally along the first skin between the first wall and the second wall.

The stiffener may be connected to and extend laterally along the second skin between the first wall and the second wall.

The stiffener may be arranged perpendicular to the first wall and the first skin.

The foregoing features and the operation of the invention will become more apparent in light of the following description and the accompanying drawings.

DETAILED DESCRIPTION

Figure 1:
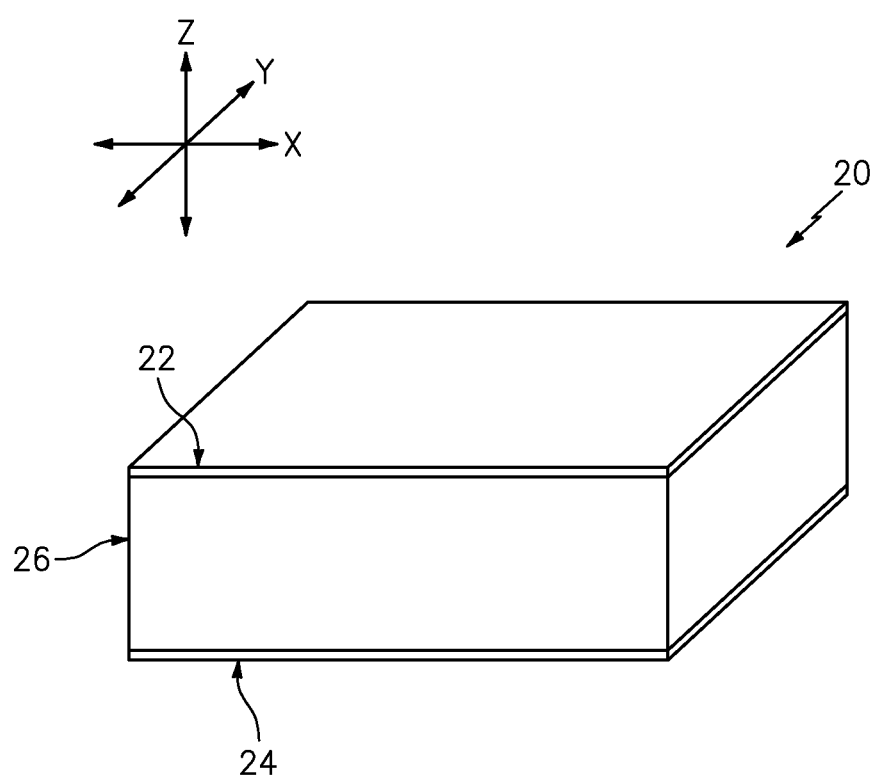
FIG. 1 is partial, perspective schematic illustration of an acoustic panel.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. Of course, the acoustic panel 20 of the present disclosure may alternatively be configured for non-aircraft applications.

The acoustic panel 20 extends longitudinally along an x-axis. The acoustic panel 20 extends laterally along a y-axis. The acoustic panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, or tapered with or without radial undulations. In such embodiments, a solely vertical direction (e.g., z-axis) direction is defined relative to a position of interest on the x-y plane. For example, on a spherical x-y plane, the vertical direction (e.g., z-axis) direction is a radial direction.

The acoustic panel 20 includes a perforated first (e.g., face) skin 22, a solid non-perforated second (e.g., back) skin 24 and a structural cellular core 26. Briefly, the cellular core 26 is disposed and extends vertically between the first skin 22 and the second skin 24. The cellular core 26 is also connected to the first skin 22 and the second skin 24. The cellular core 26, for example, may be welded, brazed, fused, adhered or otherwise bonded to the first skin 22 and/or the second skin 24. The cellular core 26 may also or alternatively be mechanically fastened to the first skin 22 and/or the second skin 24. Alternatively, the cellular core 26 may be formed integral with the first skin 22 and/or the second skin 24 as a monolithic body using, for example, a molding process or an additive manufacturing process. The present disclosure, of course, is not limited to any particular manufacturing methods.

Figure 2:
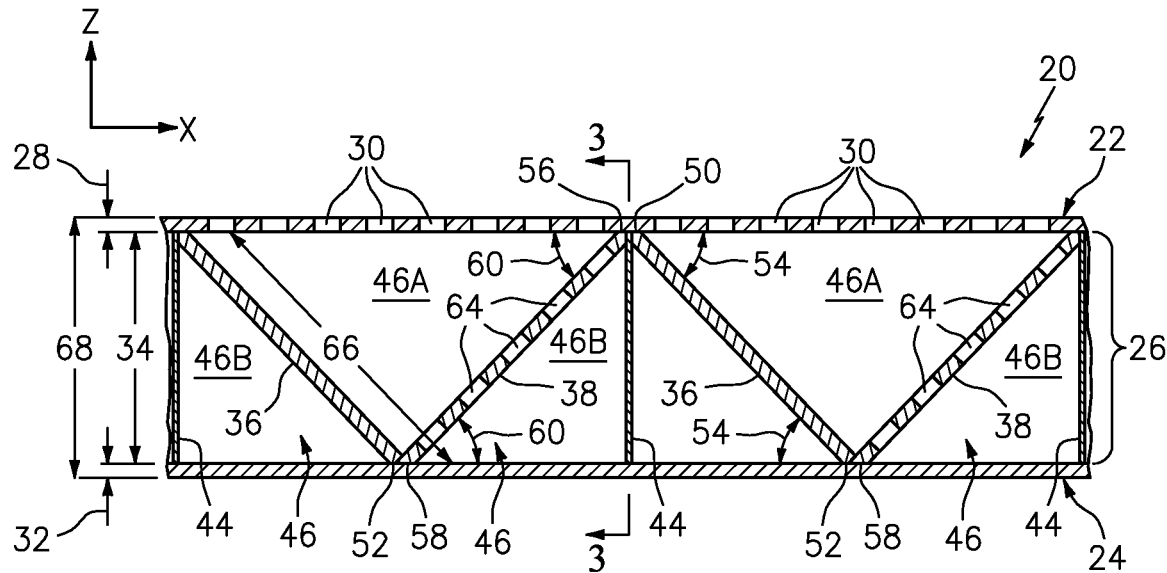
FIG. 2 is a sectional illustration of a portion of the acoustic panel taken in an x-z plane.

The first skin 22 may be configured as a relatively thin sheet or layer of material that extends laterally and longitudinally along the x-y plane. This first skin material may include, but is not limited to, a metal, a polymer, a fiber reinforced matrix (e.g., fiberglass composite, carbon fiber composite, aramid fiber composite, etc.), or a combination thereof. Referring now to FIG. 2, the first skin 22 has a vertical thickness 28, which extends vertically between opposing side surfaces. The first skin 22 includes a plurality of perforations 30; e.g., apertures such as through-holes. Each of these perforations 30 extends generally vertically through the first skin 22 between its side surfaces.

The second skin 24 may be configured as a relatively thin sheet or layer of (e.g., continuous and uninterrupted) material that extends laterally and longitudinally along the x-y plane (see FIG. 1). This second skin 24 material may include, but is not limited to, a metal, a polymer, a fiber reinforced composite (e.g., fiberglass composite, carbon fiber composite, aramid fiber composite, etc.), or a combination thereof. The second skin material may be the same as or different than the first skin material. The second skin 24 has a vertical thickness 32, which extends vertically between opposing side surfaces. This vertical thickness 32 may be substantially equal to or different (e.g., greater or less) than the vertical thickness 28 of the first skin 22.

The cellular core 26 extends laterally and longitudinally along the x-y plane (see FIG. 1). The cellular core 26 has a vertical thickness 34, which extends vertically between opposing core sides, which are abutted against the skins 22 and 24. This vertical thickness 34 may be substantially greater than the vertical thickness 28, 32 of the first skin 22 and/or the second skin 24. The vertical thickness 34, for example, may be at least ten to forty times (10-40×), or more, greater than the vertical thickness 28, 32; however, the acoustic panel 20 of the present disclosure is not limited to such an exemplary embodiment.

Figure 3:
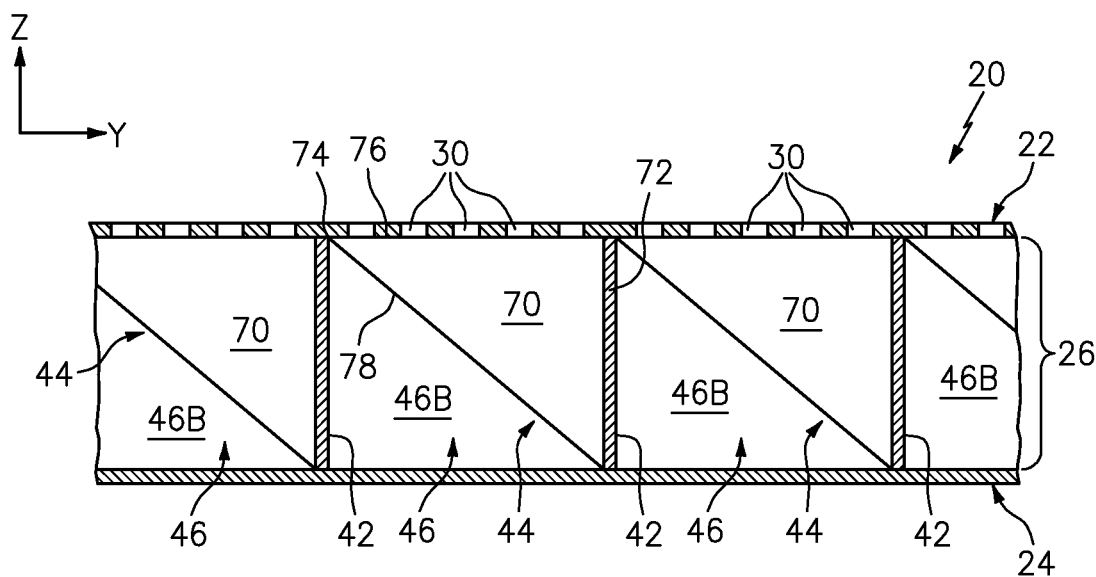
FIG. 3 is a sectional illustration of a portion of the acoustic panel taken in a y-z plane and along line 3-3 in FIG. 2.
Figure 4:
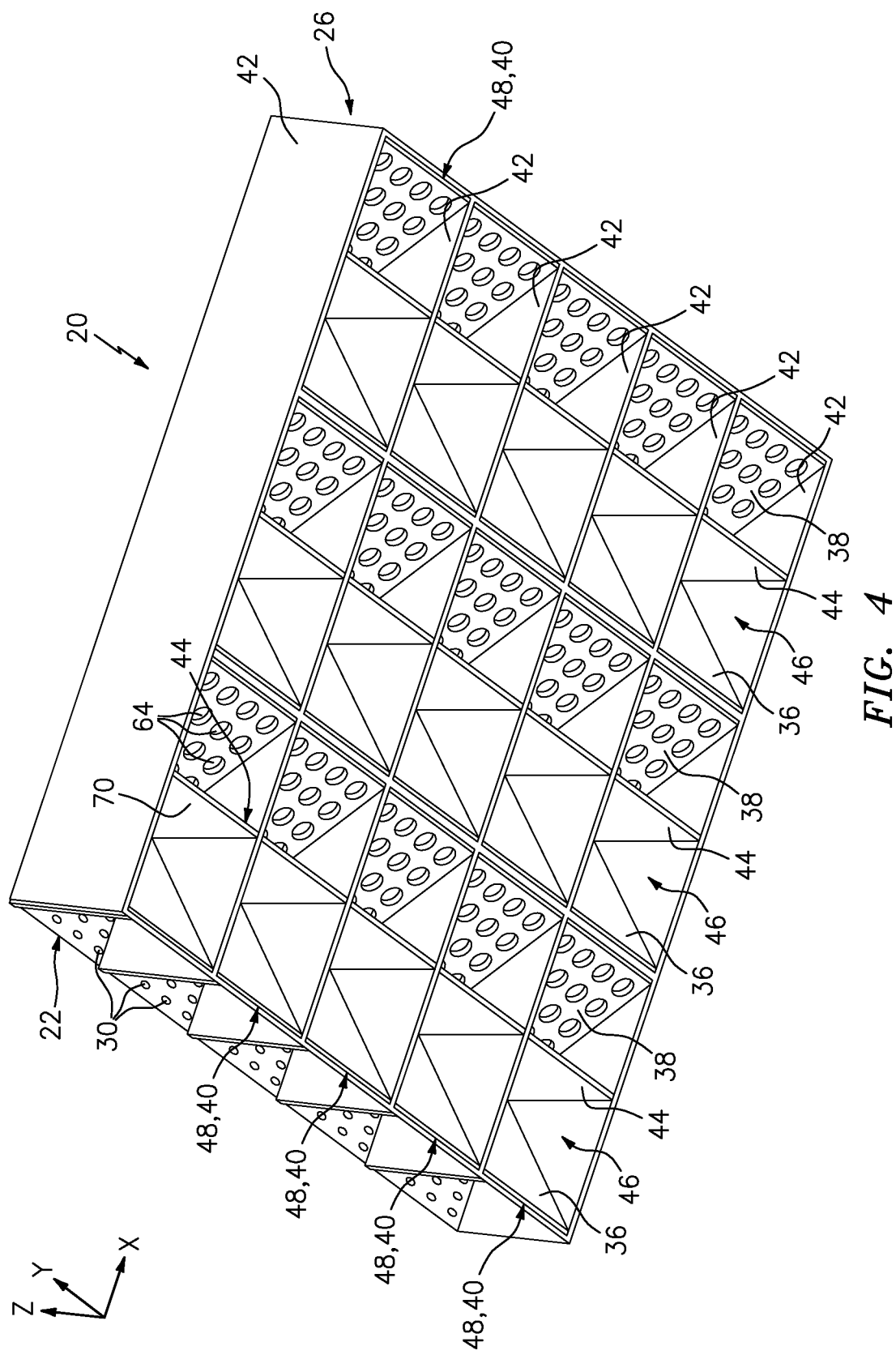
FIG. 4 is a perspective illustration of a portion of a cellular core connected to a perforated face skin.
Figure 5:
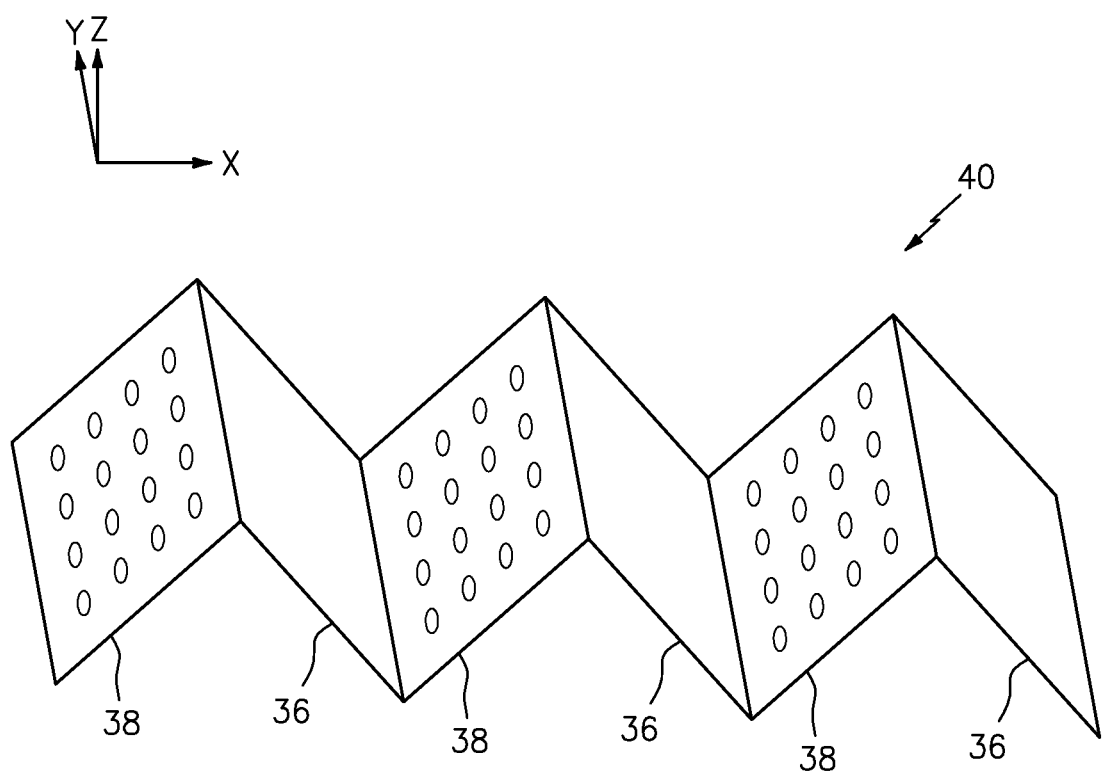
FIG. 5 is a perspective illustration of a plurality of baffles and a plurality of septums configured in a corrugated ribbon.

Referring to FIGS. 2-4, the cellular core 26 includes one or more baffles 36 and one or more perforated septums 38, which elements 36 and 38 may be arranged into one or more corrugated ribbons 40; e.g., see FIG. 5. The cellular core 26 also includes one or more walls 42 (e.g., cavity sidewalls) and one or more stiffeners 44 (e.g., intra-cavity stiffeners). These cellular core components 36, 38, 42 and 44 are arranged together to configure the cellular core 26 as an open cavity (e.g., open cell) structure. This open cavity structure forms a plurality of cavities 46 vertically between the first skin 22 and the second skin 24. These cavities 46 may be arranged in a plurality of linear arrays 48 (see FIG. 4), where each array 48 extends longitudinally along the x-axis. Each of the cavities 46 may be fluidly coupled with one or more respective perforations 30 in the first skin 22 (see FIGS. 2 and 3).

The walls 42 may be arranged generally parallel with one another. The walls 42 are laterally spaced from one another so as to respectively form the cavities 46 laterally between the walls 42. Each of the walls 42 thereby respectively forms lateral peripheral sides of the cavities 46 in at least one of the arrays 48. Each intermediate wall 42 (e.g., a wall laterally disposed between two other walls 42), more particularly, forms the lateral peripheral sides of the cavities 46 in a respective adjacent pair of the arrays 48. Each intermediate wall 42 is also disposed laterally between the respective adjacent pair of the arrays 48 and thereby fluidly separating the cavities 46 in those arrays 48 from one another.

Each of the walls 42 extends vertically between the first skin 22 and the second skin 24 (see FIGS. 2 and 3). Each of the walls 42 may also be connected (e.g., bonded and/or otherwise) to the first skin 22 and/or the second skin 24. Each of the walls 42 is orientated substantially perpendicular to the first skin 22 and the second skin 24. However, in other embodiments, one or more of the walls 42 may be angularly offset from the first skin 22 and/or the second skin 24 by a non-ninety degree angle; e.g., an acute included angle.

The baffles 36 and the septums 38 are grouped together into a plurality of linear, longitudinally extending arrays to form the corrugated ribbons 40. Each of these arrays (e.g., ribbon 40) includes a subset (e.g., linear array) of the baffles 36 and a subset (e.g., linear array) of the septums 38. The baffles 36 in each array are interdisposed with the septums 38 in that array. More particularly, each of the baffles 36 (unless configured at a longitudinal end of the wall 42) is disposed and may extend longitudinally between a respective adjacent pair of the septums 38. Similarly, each of the septums 38 (unless configured at a longitudinal end of the wall 42) is disposed and may extend longitudinally between a respective adjacent pair of the baffles 36.

Figure 6:
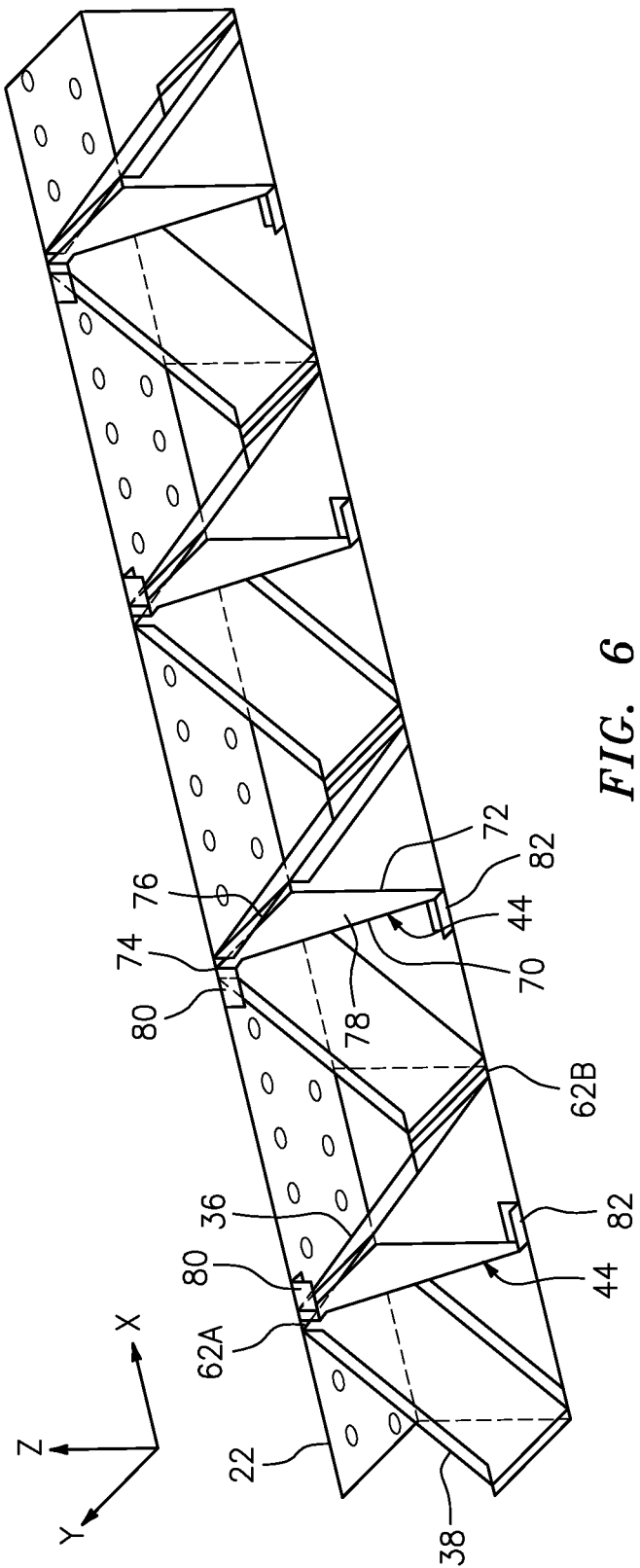
FIG. 6 is a perspective cutaway illustration of a portion of the acoustic panel with another core arrangement.
Figure 7:
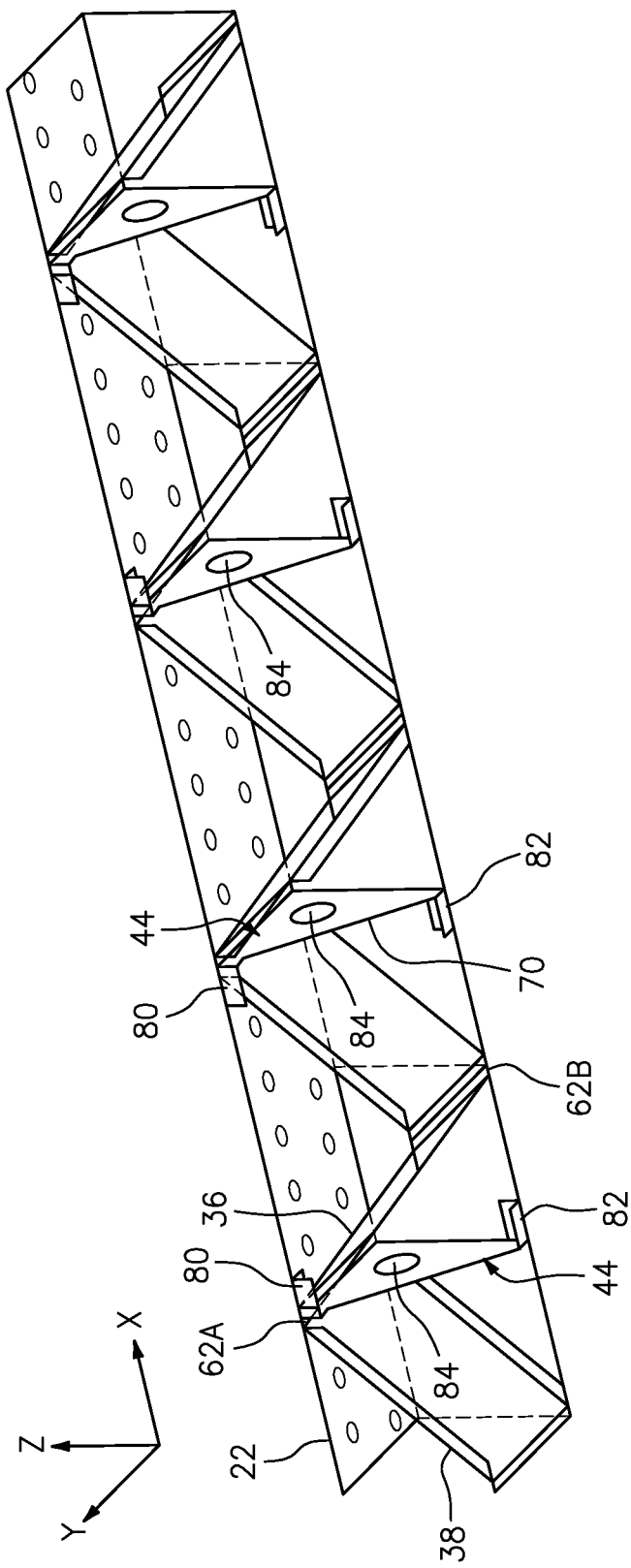
FIG. 7 is a perspective cutaway illustration of a portion of the acoustic panel with another core arrangement.

Referring to FIG. 2, one end 50 of each of the baffles 36 is disposed towards, vertically engaged with and/or connected to the first skin 22. An opposing end 52 of each of the baffles 36 is disposed towards, vertically engaged with and/or connected to the second skin 24. Thus, each of the baffles 36 may be angularly offset from the first skin 22 and the second skin 24 by an angle 54; e.g., an acute angle or other (e.g., ninety degree) angle. Similarly, one end 56 of each of the septums 38 is disposed towards, vertically engaged with and/or connected to the first skin 22. An opposing end 58 of each of the septums 38 is disposed towards, vertically engaged with and/or connected to the second skin 24. Thus, each of the septums 38 may be angularly offset from the first skin 22 and the second skin 24 by an angle 60; e.g., an acute angle or other (e.g., ninety degree) angle. In this manner, each array (e.g., ribbon 40) of baffles 36 and septums 38 of FIG. 4 has a corrugated configuration, where one of the baffles 36 and one of the septums 38 may form a single corrugation. Of course, in other embodiments, one or more of the corrugations may each include an additional element 62A-B (generally referred to as "62") such as a bridge and/or a slight gap, an example of which is shown in FIGS. 6 and 7.

Referring to FIG. 2, each of the cavities 46 extends longitudinally between and is formed by an adjacent pair of the baffles 36. Each septum 38 is disposed within and divides a respective one of the cavities 46 into fluidly coupled sub-cavities 46A and 46B. More particularly, one or more perforations 64 in the septum 34 fluidly coupled the sub-cavities 46A and 46B together.

With the foregoing core configuration, each of the cavities 46 forms a resonance chamber. A length 66 of the resonance chamber extends diagonally (e.g., along/parallel to a respective baffle 36) between the first skin 22 and the second skin 24 and through a respective one of the septums 38. The length 66 of the resonance chamber therefore is longer than the vertical thickness 34 of the cellular core 26 and/or a thickness 68 of the panel 20. This enables noise attenuation of relatively low frequency noise without increasing the vertical thickness 68 of the acoustic panel 20. For example, each resonance chamber may receive noise waves through the perforations 30 in the first skin 22. The resonance chamber may reverse the phase of one or more frequencies of those sound waves using known acoustic reflection principles and subsequently direct the reverse phase sound waves out of the acoustic panel 20 through the perforations 30 to destructively interfere with other incoming noise waves.

Referring to FIGS. 2-4, the stiffeners 44 are configured in the cellular core 26 to increase the structural rigidity and (e.g., shear) strength of the acoustic panel 20. For example, each stiffener 44 of FIG. 3 is configured with a base 70 (e.g., a flat panel or sheet of material) that projects partially into a respective one of the cavities 46. In the specific embodiment of FIGS. 2-4, each stiffener 44 is disposed within and projects partially into a respective one of the sub-cavities 46B. Each stiffener 44 is longitudinally between and next to a respective one of the baffles 36 and a respective one of the septums 38.

The stiffener base 70 of FIGS. 2-4 has a tapered configuration; e.g., is triangular in shape. In particular, the stiffener base 70 extends laterally across the cavity 46/sub-cavity 46B between a lateral first edge 72 and a lateral second edge 74. The stiffener base 70 also extends vertically between a vertical first edge 76 and a vertical second edge 78, where the vertical first and second edges 76 and 78 vertically converge towards one another as the stiffener base 70 extends laterally from the lateral first edge 72 to the lateral second edge 74. The stiffener base 70 is connected (e.g. welded, brazed, adhered and/or otherwise bonded directly) to a respective wall 42 adjacent the lateral first edge 72. The stiffener base 70 is connected (e.g. welded, brazed, adhered and/or otherwise bonded directly) to another respective wall 42 adjacent the lateral second edge 74. The stiffener 44 thereby vertically tapers as the stiffener base 70 extends laterally from one wall 42 to another wall 42. Thus, the vertical second edge 78 diverges away from the second skin 24 and/or converges towards the first skin 22 as the stiffener base 70 extends laterally from the one wall 42 to the other wall 42.

The connections between each stiffener 44 and the walls 42 enables that stiffener 44 to structurally tie the walls 42 together. The vertical first edge 76 extends laterally along the first skin 22 as the stiffener 44 extends laterally between the walls 42 and across the cavity 46/sub-cavity 46B. Each stiffener 44 may thereby be connected (e.g. welded, brazed, adhered and/or otherwise bonded directly or indirectly) to the first skin 22. Each stiffener 44 may thereby further structurally tie the first skin 22 to the respective walls 42.

Referring to FIGS. 2-4, each stiffener 44 may be arranged perpendicular to each of the elements 22, 24 and 42. Of course, in other embodiments, one or more of the stiffeners 44 may be angularly offset from the skins 22 and 24 and/or the adjacent walls 42.

Referring to FIGS. 6 and 7, in some embodiments, each stiffener 44 may include one or more mounts 80 and 82 (e.g., mounting flanges) cantilevered from the stiffener base 70.

The first mount 80 may be located at a corner between the vertical first edge 76 and the lateral second edge 74. This first mount 80 may be connected (e.g., directly or indirectly) to the first skin 22 and/or a respective adjacent wall 42 (not visible in FIGS. 6 and 7). The second mount 82 may be located at a corner between the vertical second edge 78 and the lateral first edge 72. This second mount 82 may be connected (e.g., directly or indirectly) to the second skin 24 and/or a respective adjacent wall 42. The mounts 80 and 82 thereby connect the stiffener base 70 to the core elements 22, 24 and 42. Of course, the stiffener base 70 may also be connected to the core elements 22 and 42 along one or more of its edges 76 and 72, respectively.

Referring to FIG. 7, in some embodiments, each stiffener 44 may be configured with at least one aperture 84; e.g., a through-hole. This aperture 84 extends longitudinally through the stiffener base 70 so as to fluidly couple areas to opposing sides of the stiffener 44. The aperture 84 thereby enables sound waves to travel across the stiffener 44 so as to not significantly interfere/minimize interference with sound attenuation of the resonance chamber. While each stiffener 44 in FIG. 7 is only illustrated with a single aperture, in other embodiments one or more of the stiffeners 44 may each include a plurality of such apertures.

Figure 8:
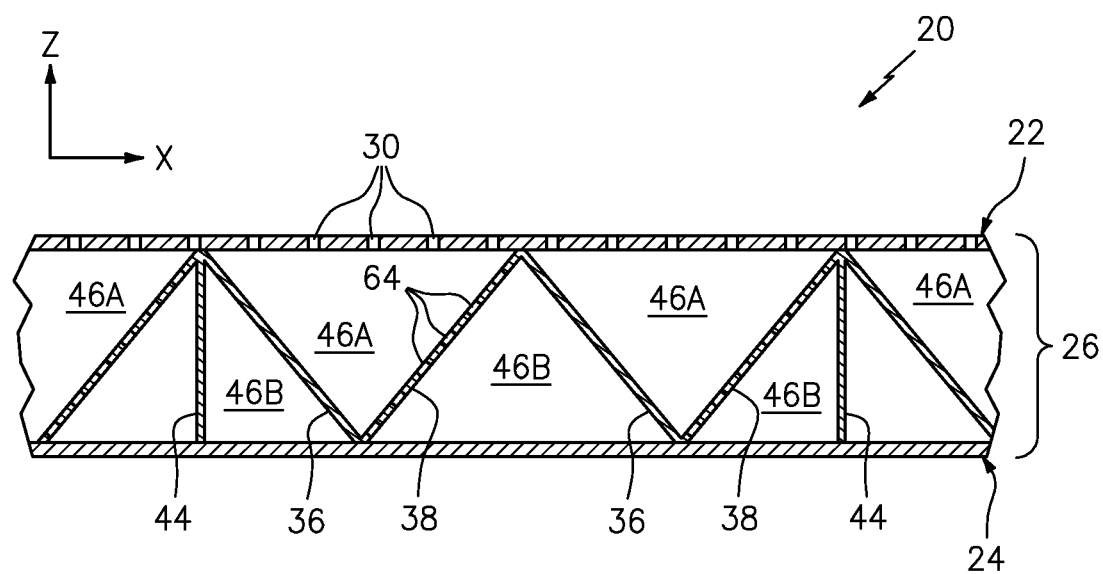
FIG. 8 is a sectional illustration of a portion of the acoustic panel with still another core arrangement.

Referring to FIGS. 2, 6 and 7, the core 26 may be configured with a stiffener 44 in each of the cavities 46 and, more particularly, each of the sub-cavities 46B. However, in other embodiments, one or more of the cavities 46 and, thus, sub-cavities 46B may be configured without a stiffener as illustrated in FIG. 8.

The arrangement of the stiffeners 44 within the cavities 46 and/or sub-cavities 46A-B may be a regular arrangement. For example, each sub-cavity 46B (or 46A) or every second, third, fourth, etc. sub-cavity 46B (or 46A) may be configured with at least one stiffener 44. Alternatively, the arrangement of the stiffeners 44 within the cavities 46 and/or sub-cavities 46A-B may be an irregular and/or clustered arrangement. For example, the stiffeners 44 may only be arranged in cavities 46 and/or sub-cavities 46A-B within a select region (or regions) of the panel 20; e.g., a region (regions) of the panel 20 that need additional reinforcement. In other examples, one region of the panel 20 may have a first density of stiffeners 44 and another region of the panel 20 may have a second density of stiffeners 44, which second density is different (e.g., greater or less) than the first density.

In some embodiments, the stiffeners 44 may be formed from a fluid impervious material; e.g., a non-porous material. In other embodiments, one or more of the stiffeners 44 may be formed from a fluid pervious material; e.g., a porous material.

The acoustic panel 20 and its cellular core 26 are described above with stiffeners 44 located within the sub-cavities 46B. However, in other embodiments, one or more of the sub-cavities 46A may also or alternatively be configured with stiffeners 44 therein.

The cellular core 26 may be constructed from any suitable material(s). The cellular core 26, for example, may be constructed from a metal, a polymer, a fiber reinforced composite (e.g., fiberglass composite, carbon fiber composite, aramid fiber composite, etc.), or a combination thereof. One or more of components of the cellular core 26 may be constructed from the same or a like material. Alternatively, one or more of the components of the cellular core 26 may be constructed from a different material than one or more of the other components of the cellular core 26.

Figure 9:
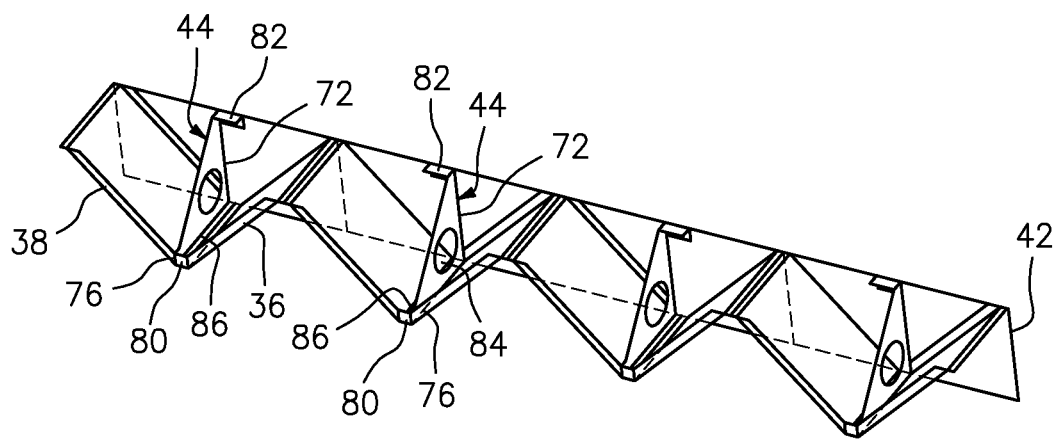
FIGS. 9-15 are perspective illustrations of portions of alternative cores for the panel of FIG. 1.
Figure 10:
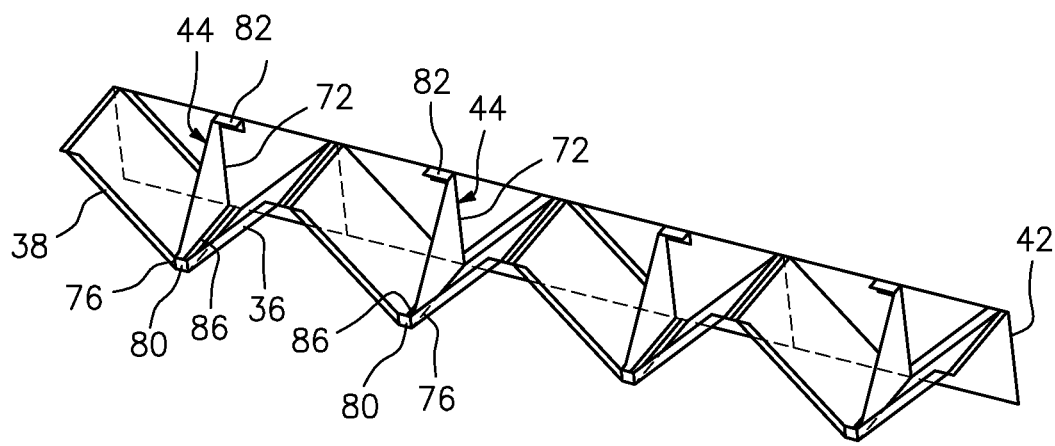

In some embodiments, referring to FIGS. 9 and 10, one or more of the stiffeners 44 may each include a base mount 86; e.g., a flange. This base mount 86 may be included in addition to (or as an alternative to) the mounts 80 and/or 82. The base mount 86 of FIGS. 9 and 10 extends laterally along the vertical first edge 76. However, in other embodiments, the base mount 86 may extend vertically along the lateral first edge 72. Of course, in still other embodiments, base mounts may be arranged with and project out from both edges 72 and 76.

Figure 11:
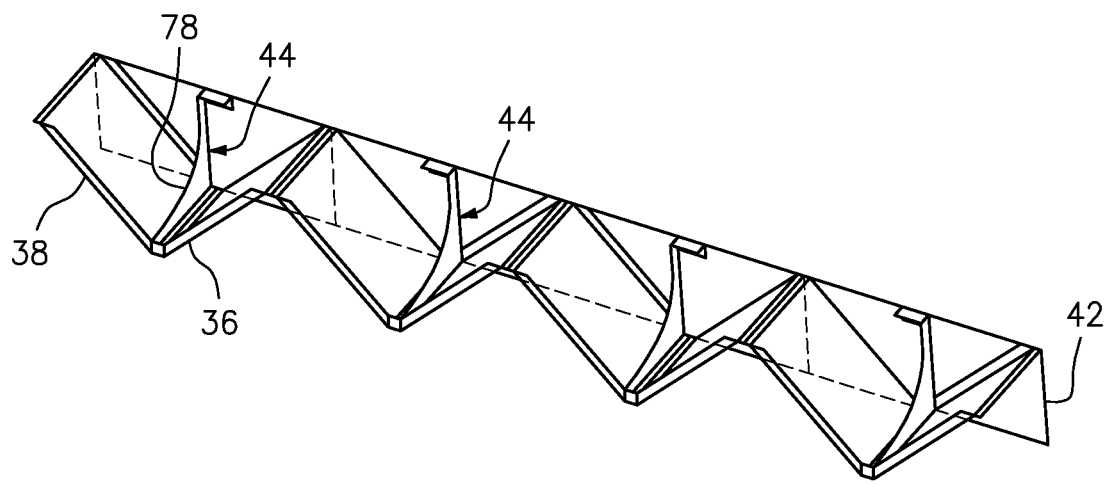
Figure 12:
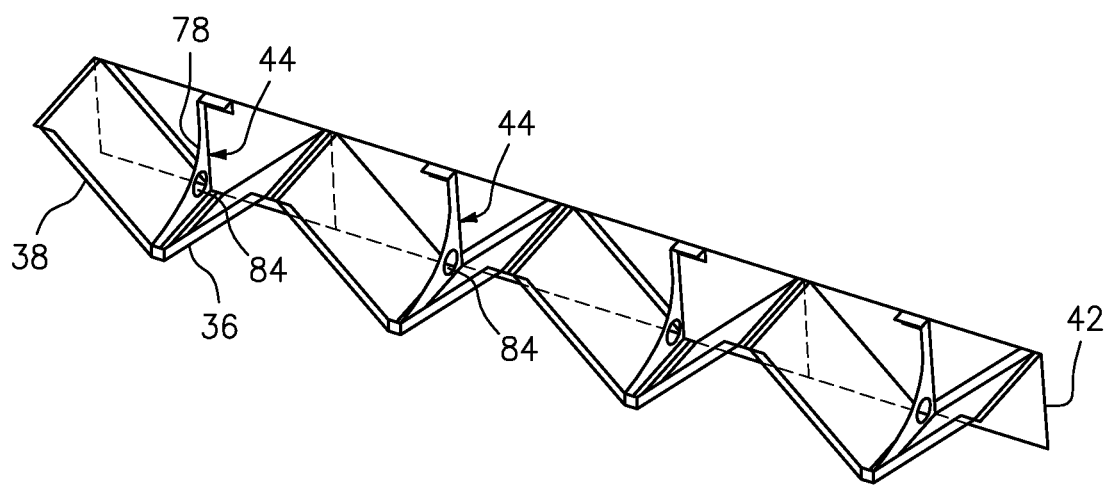

In some embodiments, referring to FIGS. 11 and 12, one or more of the stiffeners 44 may each be configured with a curved or otherwise non-straight vertical second edge 78. For example, the vertical second edge 78 of FIGS. 11 and 12 may follow a hyperbolic curve. In other examples, the vertical second edge 78 may follow a circular arc, an oval arc, an elliptical arc or a curved spline. The present disclosure, of course, is not limited to the foregoing exemplary edge 78 geometries.

Figure 13:
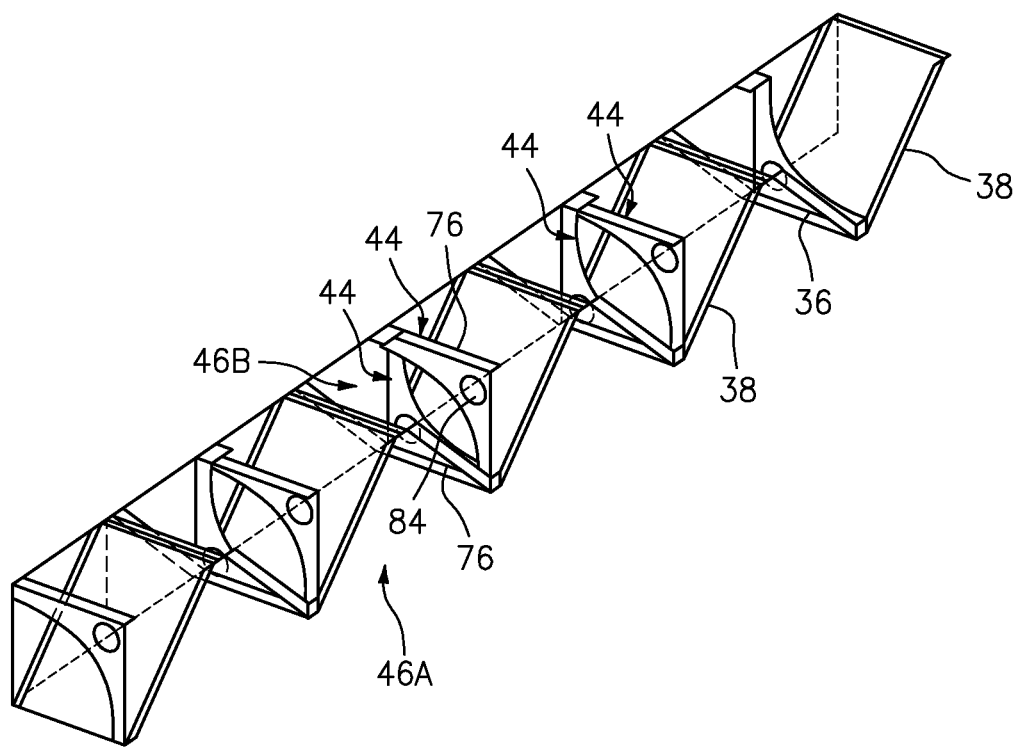
Figure 14:
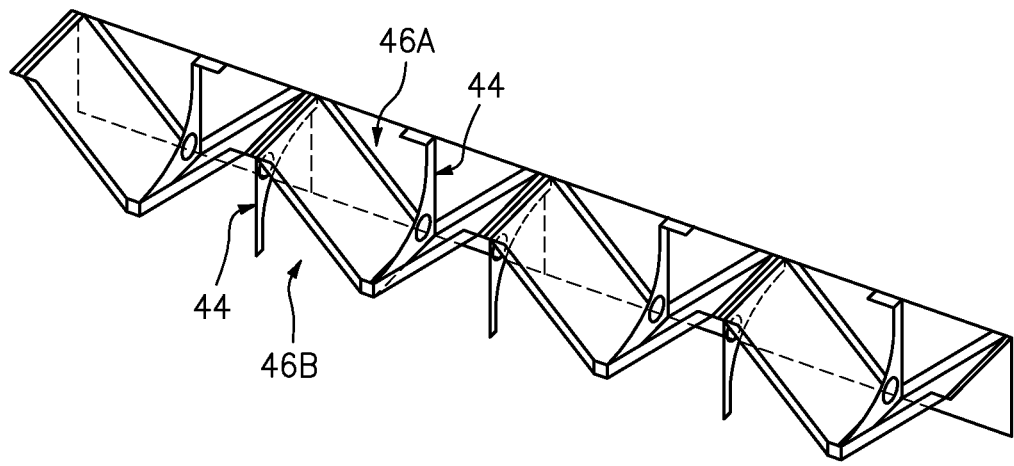
Figure 15:
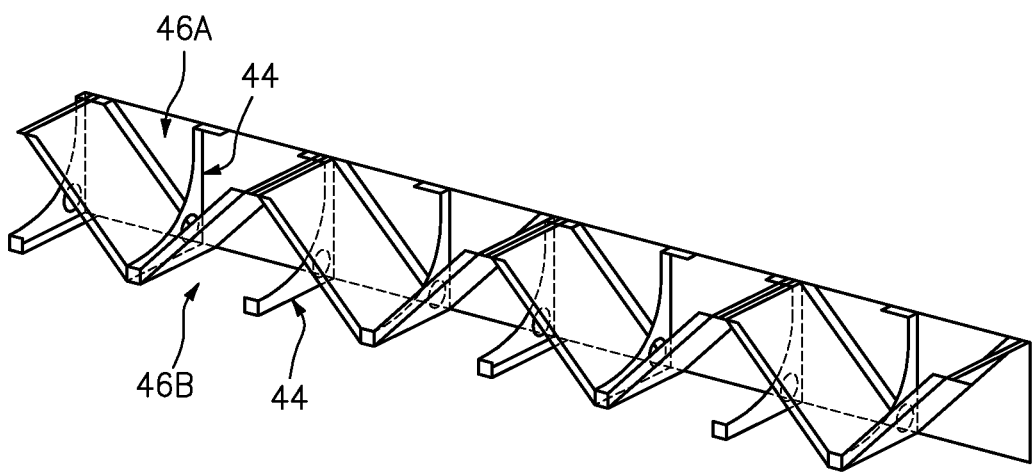

In some embodiments, referring to FIGS. 13-15, one or more of the cavities 46 may be configured with a plurality of the stiffeners 44. For example, in the embodiments of FIG. 13, one or more or each of the sub-cavities 46B (or alternatively 46A) is configured with a pair of the stiffeners 44. This pair of stiffeners 44 are substantially longitudinally aligned, but configured as substantial mirror images of one another. In this manner, the first vertical edge 76 of one of the stiffeners 44 may be connected to the first skin 22 (not visible in FIG. 13) whereas the first vertical edge 76 of the other one of the stiffeners 44 may be connected to the second skin 24 (not visible in FIG. 13). By contrast, in the embodiments of FIGS. 14 and 15, a stiffener 44 may be configured in each sub-cavity 46A and a stiffener 44 may be configured in each sub-cavity 46B. In the embodiments of FIG. 14, the stiffeners 44 in the sub-cavities 46A are configured as mirror images to the stiffeners 44 in the sub-cavities 46B. In the embodiment of FIG. 15, the stiffeners 44 in the both sub-cavities 46A and 46B have similar orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
   a perforated first skin;
   a second skin; and
   a core including a first wall, a second wall and a stiffener;
   the core forming a plurality of cavities that extend vertically between the perforated first skin and the second skin and that extend laterally between the first wall and the second wall, the plurality of cavities including a first cavity; and
   the stiffener projecting partially into the first cavity, the stiffener and connected to the first wall and the second wall, and the stiffener comprising a flat panel that extends laterally across the first cavity from the first wall to the second wall.

2. The acoustic panel of claim 1, wherein one or more perforations in the perforated first skin are fluidly coupled with the first cavity.

3. The acoustic panel of claim 2, wherein
the first cavity forms a resonance chamber having a minimum length that extends between the perforated first skin and the second skin along a baffle; and
the minimum length is longer than a vertical thickness of the core.

4. The acoustic panel of claim 1, wherein
the core further includes a plurality of baffles and a plurality of septums, the plurality of baffles include a first baffle and a second baffle, and the plurality of septums include a first septum;
the plurality of baffles are arranged in a longitudinal linear array, each of the plurality of baffles is connected to and extends laterally between the first wall and the second wall, and the first cavity extends longitudinally between the first baffle and the second baffle;
the plurality of septums are arranged in a longitudinal linear array, each of the plurality of septums is connected to and extends laterally between the first wall and the second wall, the first septum is disposed between the first baffle and the second baffle, and the first septum divides the first cavity into fluidly coupled first and second sub-cavities.

5. The acoustic panel of claim 4, wherein the stiffener projects partially into the first sub-cavity and is between the first baffle and the first septum.

6. The acoustic panel of claim 1, wherein an edge of the stiffener extends laterally along and parallel with the perforated first skin from the first wall to the second wall.

7. The acoustic panel of claim 1, wherein the stiffener is arranged perpendicular to the first wall and the perforated first skin.

8. The acoustic panel of claim 1, wherein the stiffener is configured with a triangular base that extends laterally across the first cavity.

9. The acoustic panel of claim 1, wherein
the stiffener includes a base and a mount cantilevered from the base;
the base extends laterally across the first cavity; and
the mount is bonded to at least one of the first wall or the second skin.

10. The acoustic panel of claim 9, wherein
the stiffener further includes a second mount cantilevered from the base; and
the mount is bonded to at least one of the second wall or the perforated first skin.

11. The acoustic panel of claim 1, wherein an aperture extends longitudinally through the stiffener.

12. The acoustic panel of claim 1, wherein
the plurality of cavities further include a second cavity longitudinally adjacent the first cavity; and
the core further includes a second stiffener projecting partially into the second cavity and connected to the first wall and the second wall.

13. The acoustic panel of claim 1, wherein
the plurality of cavities further include a second cavity longitudinally adjacent the first cavity; and
the core is configured without a stiffener within the second cavity.

14. The acoustic panel of claim 1, wherein the core comprises fiber-reinforced composite material.

15. The acoustic panel of claim 1, wherein the perforated first skin, the second skin and the core form a component of an aircraft propulsion system.

16. An acoustic panel, comprising:
a first skin;
a second skin; and
a core including a first wall, a second wall and a stiffener;
the core forming a plurality of cavities, the plurality of cavities extending vertically along a z-axis between the first skin and the second skin, the plurality of cavities extending laterally along a y-axis between the first wall and the second wall, the plurality of cavities including a first cavity; and
the stiffener projecting partially into the first cavity, the stiffener extending vertically along the z-axis in a direction towards the first skin to an edge of the stiffener, and the edge of the stiffener extending parallel with the first skin as the edge of the stiffener extends laterally along the y-axis across the first cavity from the first wall to the second wall;
wherein an aperture extends longitudinally along an x-axis through the stiffener; and
wherein one or more perforations in the first skin are fluidly coupled with the first cavity.

17. The acoustic panel of claim 16, wherein the stiffener is connected to the first wall and the second wall.

18. The acoustic panel of claim 16, wherein the stiffener is connected to the first skin between the first wall and the second wall.

19. The acoustic panel of claim 16, wherein the stiffener is arranged perpendicular to the first wall and the first skin.

20. An acoustic panel, comprising:
a perforated first skin;
a second skin; and
a core including a first wall, a second wall and a stiffener;
the core forming a plurality of cavities that extend vertically between the perforated first skin and the second skin and that extend laterally between the first wall and the second wall, the plurality of cavities including a first cavity; and
the stiffener projecting partially into the first cavity, the stiffener connected to the first wall and the second wall, and the stiffener extending vertically to the second skin.

* * * * *